United States Patent US 11,186,496 B2
Bursztein
Nov. 30, 2021

(54) INDICATOR FOR FILTERING CARTRIDGE MANAGEMENT FOR A FILTERING BOTTLE, A FILTERING BOTTLE COMPRISING SUCH AN INDICATOR FOR FILTERING CARTRIDGE MANAGEMENT AND A SET COMPRISING A FILTERING BOTTLE AND SUCH AN INDICATOR FOR FILTERING CARTRIDGE MANAGEMENT

(71) Applicant: FORMASTER S.A., Kielce (PL)

(72) Inventor: Maciej Bursztein, Masłów Pierwszy (PL)

(73) Assignee: FORMASTER S.A., Kielce (PL)

( * ) Notice: Subject to any disclaimer, the term of this patent is extended or adjusted under 35 U.S.C. 154(b) by 159 days.

(21) Appl. No.: 16/491,691

(22) PCT Filed: Mar. 7, 2018

(86) PCT No.: PCT/IB2018/051474
§ 371 (c)(1),
(2) Date: Sep. 6, 2019

(87) PCT Pub. No.: WO2018/163081
PCT Pub. Date: Sep. 13, 2018

(65) Prior Publication Data
US 2021/0130191 A1    May 6, 2021

(30) Foreign Application Priority Data
Mar. 7, 2017 (PL) .................................. 420761

(51) Int. Cl.
*C02F 1/00* (2006.01)
*A45F 3/16* (2006.01)
*B01D 35/143* (2006.01)

(52) U.S. Cl.
CPC .............. *C02F 1/003* (2013.01); *A45F 3/16* (2013.01); *B01D 35/143* (2013.01);
(Continued)

(58) Field of Classification Search
CPC ......................... C02F 1/003; C02F 2209/445; C02F 2307/02; C02F 2307/04; B01D 35/143;
(Continued)

(56) References Cited

U.S. PATENT DOCUMENTS

| 4,895,648 | A | 10/1990 | Hankammer |
| 4,986,901 | A | 1/1991 | Nohren, Jr. et al. |
| 5,188,251 | A | 2/1993 | Kusz |
| 5,299,701 | A | 4/1994 | Barker et al. |
| 6,224,751 | B1 * | 5/2001 | Hofmann ................ C02F 1/003 210/85 |

(Continued)

FOREIGN PATENT DOCUMENTS

| DE | 4135637 A1 * | 5/1993 | .............. C02F 1/003 |
| WO | 2001/16029 A1 | 3/2001 | |
| WO | 2001/46029 A2 | 6/2001 | |

OTHER PUBLICATIONS

English Translation of the Description of DE 4135637 A1 from epacenet.com website downloaded Apr. 2021.*

(Continued)

*Primary Examiner* — Terry K Cecil
(74) *Attorney, Agent, or Firm* — Browdy and Neimark, PLLC

(57) ABSTRACT

An indicator for management of a filter cartridge for a filtering bottle, the bottle including a container with a neck, a filter cartridge and a cap with a coat. The indicator includes a first ring, a second ring arranged coaxially on the first ring, wherein the first and the second rings are rotatable relative to each other. One of the rings includes markings relating to the filter cartridge arranged around the ring and defining a time unit. The other ring includes an indicating element for indicating a selected marking relating to the filter cartridge by rotating one of the rings relative to the other. The (Continued)

indicator for management of the filter cartridge is also adapted to be mounted around the neck of the container of the filtering bottle under the coat of the cap. Furthermore, a filtering bottle and such an indicator for management of a filter cartridge and a set of a filtering bottle and such an indicator for management of a filter cartridge are described.

22 Claims, 7 Drawing Sheets

(52) U.S. Cl.
CPC ... *A45F 2003/163* (2013.01); *C02F 2201/006* (2013.01); *C02F 2209/445* (2013.01); *C02F 2307/02* (2013.01)

(58) Field of Classification Search
CPC .................. B65D 2583/0409; B65D 51/00; B65D 55/00; A45F 2003/163
See application file for complete search history.

(56) References Cited

U.S. PATENT DOCUMENTS

| | | | |
|---|---|---|---|
| 6,565,743 B1 * | 5/2003 | Poirier | B65D 51/00 116/284 |
| 10,189,720 B2 * | 1/2019 | Ishikawa | B01D 63/02 |
| 2011/0278206 A1 | 11/2011 | Hull et al. | |

OTHER PUBLICATIONS

English Translation of the claims of DE 4135637 A1 from epacenet.com website downloaded Apr. 2021.*
www.bjsklep.pl/149-thickbox_default/dzbanek-filtrujacy-brita-marella-cool-wklad-maxtra.jpg, Oct. 13, 2014.
http://kuchnika.pl/pol_pl_Butelka-Pure-z-zelowyn-wkladem-i-filtrem-COOL-GEAR-950-ml-918_4.jpg, Jun. 23, 2014.
Polish search report in corresponding application P420761, dated Jul. 14, 2017.
International Search report in corresponding PCT/IB2018/051474, dated Jul. 26, 208.

* cited by examiner

INDICATOR FOR FILTERING CARTRIDGE MANAGEMENT FOR A FILTERING BOTTLE, A FILTERING BOTTLE COMPRISING SUCH AN INDICATOR FOR FILTERING CARTRIDGE MANAGEMENT AND A SET COMPRISING A FILTERING BOTTLE AND SUCH AN INDICATOR FOR FILTERING CARTRIDGE MANAGEMENT

FIELD OF THE INVENTION

The present invention relates generally to an indicator for filter cartridge management for use in a filtering bottle. Furthermore, the present invention relates to a filtering bottle comprising such an indicator for filter cartridge management. The present invention relates also to a set comprising a filtering bottle and an indicator for filter cartridge management.

BACKGROUND OF THE INVENTION

Filtering bottles are present on the market for several years. Such filtering bottles comprise a bottle-shaped container capable of being held with one hand. The container comprises a neck in which a filter cartridge is placed, usually in the form of a finger filter. The filter cartridge is fixed within the neck of the container by means of a cap.

In order to fill the filtering bottle, the cap is unscrewed and the filter cartridge is removed. Then, water is poured into the container through the neck for purifying, the filter cartridge is slid back in and the cap is screwed back on. Water is purified as the bottle is used by flowing into the user's mouth through the filter cartridge and the mouthpiece in the cap. The filtering of water in the bottle may be aided by pressing the container so as to generate additional pressure to intensify the flow of water through the filter cartridge.

Such filtering bottles, therefore, are convenient, portable, reusable filtering devices allowing to provide freshly treated water suitable for drinking, at any time and place, where such bottles may be filled with water from commonly available sources, especially tap water.

The filter cartridges of filtering bottles should be reconditioned or replaced. Such a filter should be replaced following filtering a precisely defined amount of water, wherein said amount is characteristic of a specific design of a filter cartridge. Measuring of the volume of water filtered by means of such filtering devices is extremely difficult. Hence, it is the time during which a defined amount of water is purified in the course of normal use of a filtering bottle that is estimated. The user of a filtering bottle tends to forget when they installed the filter cartridge and/or when the same should be reconditioned or replaced.

There are known indicators for filtering bottles on which the time of installation of a reconditioned or a new filter cartridge is set. Unfortunately, such known indicators for managing a filter cartridge are complicated, are not easily replaced nor can be applied separately from a filtering bottle.

Therefore, there is a demand for an indicator for filter cartridge management for a filtering bottle, the indicator having a simple and reliable structure. Moreover, there is a demand for an indicator for filter cartridge management for a filtering bottle which the indicator is easily replaced and can be provided as an accessory for a filtering bottle, for example with a new filter cartridge. Additionally, there is a demand for an indicator for filter cartridge management filtering for bottle which the indicator can be easily used in separation from a filtering bottle.

SUMMARY OF THE INVENTION

The present invention, therefore, provides an indicator for filter cartridge management for a filtering bottle, the bottle comprising a container with a neck, a filter cartridge and a cap with a coat. The indicator according to the invention is characterized in that it comprises a first ring, a second ring placed coaxially on the first ring, wherein the first and the second rings are rotatable relative to each other. One of the rings of the filter cartridge management according to the present invention comprises markings relating to the filter cartridge, the markings being arranged around said ring and denoting a time unit. The other of the rings of the filter cartridge management according to the present invention comprises an indicating element for indicating the selected marking relating to the filter cartridge, such marking being selected by rotating one of the rings relative to the other. The indicator for filter cartridge management is adapted to be mounted around the neck of the filtering bottle container under the coat of the cap.

Preferably, the markings relating to the filter cartridge are markings defining at least one of the days of the weekdays, weeks, months.

Preferably, the markings relating to the filter cartridge are selected from among the time unit indicating the time of installation of a filter cartridge and the time unit indicating the recommended time of replacement of a filter cartridge.

Preferably, the indicating element is a window for displaying the marking, a protrusion for indicating the marking or a symbol for indicating the marking.

Preferably at least one of the rings comprises mounting means for mounting the indicator to the bottle.

Preferably, at least one of the rings comprises means for improving gripping.

Preferably, the means for improving gripping is a cavity in the circumference of the ring, a series of notches on the circumference of the ring or a protrusion on the circumference of one of the rings.

Moreover, the present invention provides a filtering bottle with an indicator for filter cartridge management, the bottle comprising a container with a neck, a filter cartridge arranged inside the bottle and extending to the inside of the filtering bottle container, a cap containing a coat, arranged on the neck of the filtering bottle container and holding the filter cartridge in the container's neck, and an indicator for filter cartridge management. The filtering bottle is characterized in that the indicator for filter cartridge management comprises a first ring, a second ring arranged coaxially on the first ring, wherein the first and the second rings are rotatable relative to each other. One of the rings of the indicator for filter cartridge management comprises markings relating to the filter cartridge, the markings being arranged around said ring and denoting a time unit. The other ring of the indicator for filter cartridge management comprises an indicating element for indicating the selected marking relating to the filter cartridge by rotating one of the rings relative to the other. The indicator for cartridge management indicator is arranged around the neck of the filtering bottle container according to the invention, under the coat of the cap.

Preferably, the markings relating to the filter cartridge of the indicator for filter cartridge management for the filtering bottle are markings defining at least one of the weekdays, weeks, months.

Preferably, the markings relating to the filter cartridge of the indicator for filter cartridge management for the filtering bottle are selected from among the time unit indicating the time of installation of a filter cartridge and the time unit indicating the recommended time of replacement of the filter cartridge.

Preferably, the indicating element of the indicator for filter cartridge management for the filtering bottle is a window for displaying the marking, a protrusion for indicating the marking or a symbol for indicating the marking.

Preferably, the indicator for filter cartridge management is fixed to the filtering bottle by means of mounting means comprised by at least one of the rings.

Preferably, at least one of the rings of the indicator for filter cartridge management for they filtering bottle comprises means for improving gripping.

Preferably, the means for improving gripping is a cavity on the circumference of the ring, a series of notches on the circumference of the ring or a protrusion on the circumference of one of the rings.

The present invention provides also a set of a filtering bottle and an indicator for filter cartridge management. The set according to the present invention comprises a filtering bottle, the bottle containing a container with a neck, a filter cartridge for placing it in the neck of the filtering bottle and a cap with a coat for placing on the neck of the container of the filtering bottle and an indicator for filter cartridge management. The indicator according to the present invention is characterized in that it comprises a first ring, a second ring placed coaxially on the first ring, wherein the first and the second rings are rotatable relative to each other. One of the rings of the indicator for filter cartridge management comprises markings relating to the filter cartridge, arranged around said ring and denoting a time unit. The other of the rings of the indicator for filter cartridge management comprises an indicating element for indicating the selected marking relating to the filter cartridge by rotating one of the rings relative to the other. The indicator for filter cartridge management of the set according to the present invention is adapted to be placed around the neck of the container of the filtering bottle, under the coat of the cap.

Preferably, the markings relating to the filter cartridge of the indicator of the filter cartridge management of the set are markings defining at least one of the weekdays, weeks, months.

Preferably, the markings relating to the filter cartridge of the indicator of the filter cartridge management of the set are selected from among the time units indicating the time of installation of the filter cartridge and the time unit indicating the recommended time of replacement of the filter cartridge.

Preferably, the indicating element of the filter cartridge of the indicator of the filter cartridge management of the set is a window for displaying the marking, a protrusion for indicating the marking or a symbol for indicating the marking.

Preferably, at least one of the rings comprises mounting means for mounting the indicator to the bottle.

Preferably, at least one of the rings of the filter cartridge of the indicator of the filter cartridge management of the set comprises means for improving gripping.

Preferably, the means for improving gripping is a cavity in the circumference of the ring, a series of notches on the circumference of the ring or a protrusion on the circumference of one of the rings.

The present invention provides, therefore, an indicator for filter cartridge management having a simple and reliable structure. Furthermore, if necessary, the indicator for filter cartridge management according to the invention can be easily and quickly changed in the filtering bottle. The indicator for filter cartridge management according to the invention can be provided as an accessory, a replacements part for the filtering bottle or separately, together with a filter cartridge in a set. The indicator for filter cartridge management according to the invention can be also used out of the filtering bottle.

DESCRIPTION OF FIGURES OF THE DRAWING

The present invention will now be described in more detail with reference to the figures of the drawing, wherein.

DETAILED DESCRIPTION OF THE INVENTION

Figure 1:
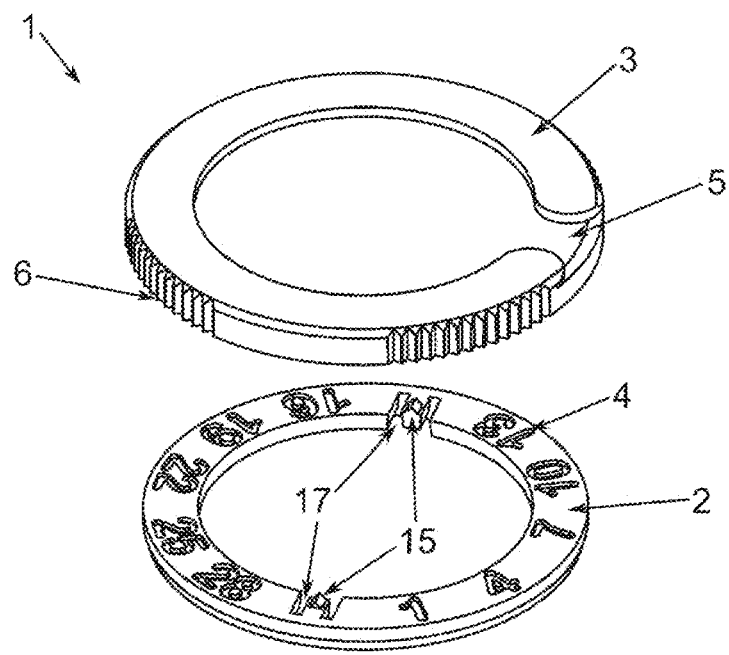
FIG. 1 shows a perspective top exploded view of an indicator for filter cartridge management according to one of the preferred embodiments of the invention.
Figure 2:
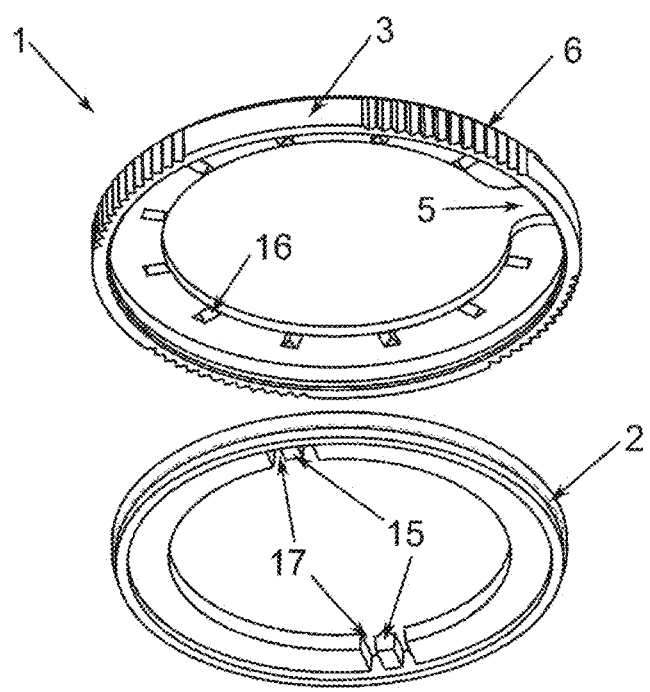
FIG. 2 shows a perspective bottom exploded view of an indicator for filter cartridge management according to the embodiment of the invention of FIG. 1.
Figure 3:
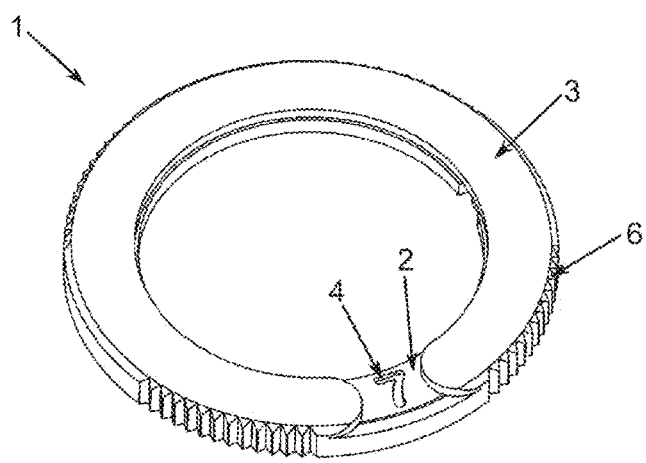
FIG. 3 shows a perspective top view of an indicator for filter cartridge management according to the embodiment of the invention of FIG. 1.
Figure 4:
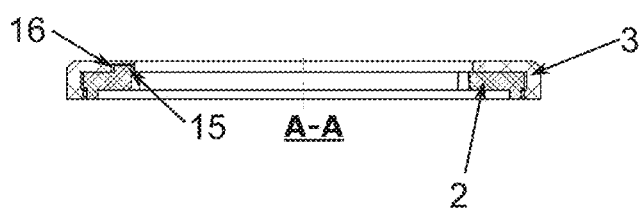
FIG. 4 shows a top view of an indicator for filter cartridge management according to the embodiment of the invention of FIG. 3, and a cross-section along the line A-A and B-B, respectively.
Figure 4:
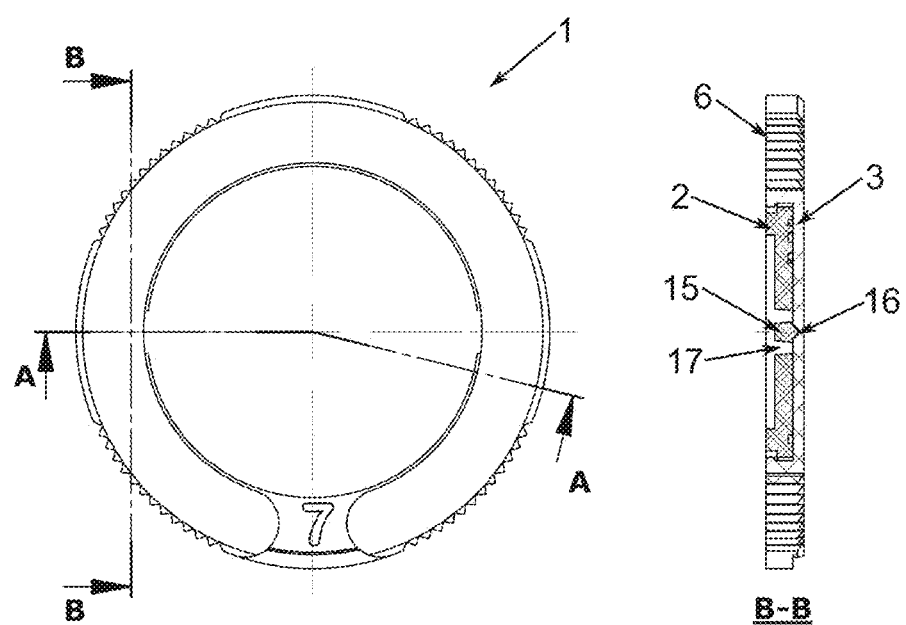
Figure 5:
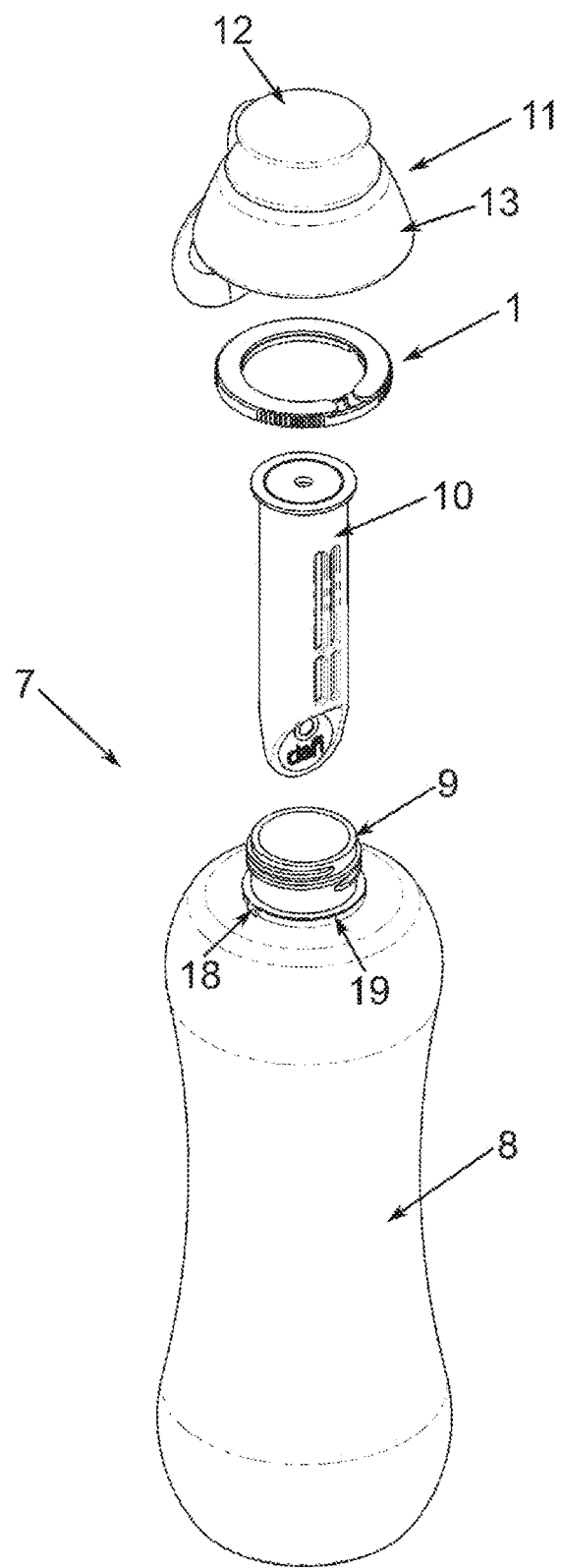
FIG. 5 shows a perspective top exploded view of a filtering bottle according to one of the preferred embodiments of the invention with an indicator for filter cartridge management.
Figure 6:
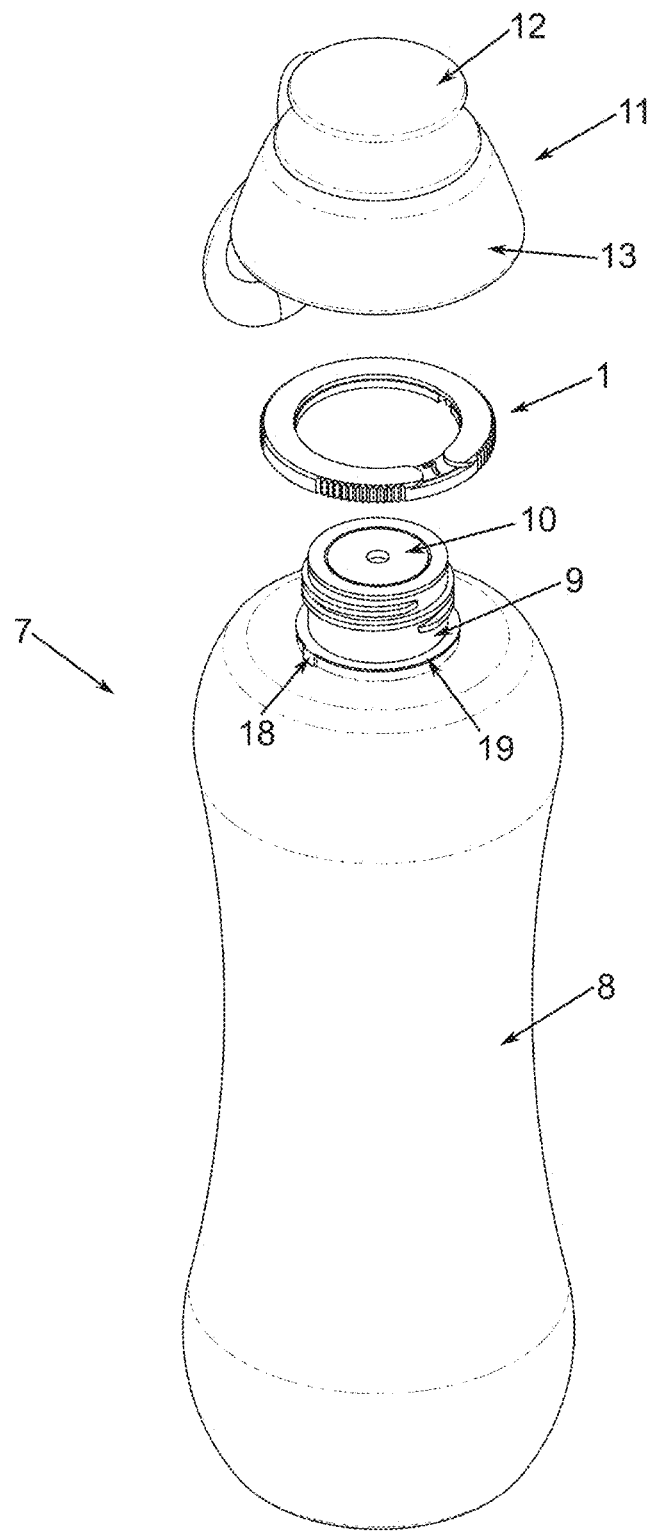
FIG. 6 shows another perspective top exploded view of a filtering bottle with an indicator filter cartridge management according to the embodiment of the invention of FIG. 5.

As shown in FIGS. 1 and 2, an indicator 1 for filter cartridge management comprises a first ring 2 and a second ring 3. The first and the second rings are arranged substantially in contact one on top of the other, along the main axis extending through the central opening of the first and second rings 2, 3, such that they create a stack, as shown in FIGS. 3 and 4. The first and the second rings 2, 3 are rotatable relative to each other around the main axis. In a preferred embodiment of the indicator 1 for management of the filter cartridge 10 the second ring 3 overlaps the circumferential side wall of the first ring 2 and terminates along the lower edge of said first ring. Consequently, in this preferred embodiment, the second ring 3 encompasses the first ring 2 from the outside, as shown in FIGS. 3 and 4.

In a preferred embodiment of the indicator 1 for filter cartridge management, the first ring 2 comprises at least one latch element in the form of a protrusion. In a preferred embodiment, the first ring 2 comprises two latch elements 15 in the form of protrusions arranged on the opposite sides of the central opening of the first ring 2, as shown in FIGS. 1 and 2. The second ring 3 of the indicator 1 for management of the filter cartridge 10 comprises a series of cavities arranged on the side of the first ring 2 and around the central opening, as shown in FIG. 2. The latch element/elements 15 of the first ring cooperate with the cavities 16 of the second ring, as shown in the cross-sections of FIG. 4, with the creation of a latch mechanism. While rotating, the latch element 15 of the first ring 2, following applying rotating force to one of the first or the second rings 2,3, slides out of the cavity 16 of the second ring 3 and moves over its surface, appears over the next cavity, in which it is latched. The latch mechanism allows to set the rings 2,3 rotatably relative to each other in specified positions and prevents incidental or unintended rotation of the rings 2, 3 relative to each other. Based on the above description of the latch mechanism, it will be known to a person skilled in the art that the latch mechanism may have an inverse configuration. This means that the latch element/latch elements 15 can be arranged on the other ring 3, while the cavities 16 cooperating with them can be arranged similarly on the first ring 2. Based on the above description of the latch element, it will also be known to a person skilled in the art which alternative components to apply to arrive at a mechanism functioning as a latch mechanism.

In a preferred embodiment, as shown in FIG. 1, the first ring 2 of the indicator 1 comprises markings 4 of time units. As shown in FIG. 1, the markings are arranged around the central cavity. The markings may specify a weekday, a week or a month. The markings 4 can be Arabic numerals, Roman numerals or time units expressed in another system, e.g. alphabetic or pictographic, clearly expressing a desired time unit. In one preferred embodiment, the markings 4 are convex relative to the surface of the first ring 2 of the indicator 1. In another preferred embodiment, the markings are concave relative to the surface of the first ring 2. In yet another preferred embodiment, the markings 4 are printed, glued or applied onto the surface of the first ring by means of another, similar technique of applying markings 4. The second ring 3 of the indicator 1 comprises an indicating element 5 for indicating or displaying the marking on the first ring 2. In a preferred embodiment, the indicating element 5 of the second ring 3 of the indicator 1 for management of the filter cartridge 10 is in such a spatial relation with the cavities 16 on this ring that the indicating element 5 indicates, shows or presents only one and entire marking 4. In a preferred embodiment, the indicating element 5 is a slot on the top side of the second ring 3 large enough to display therein a marking 4, as shown in FIGS. 3 and 4. In another preferred embodiment, the indicating element 5 is a window large enough to show therein a marking 4 from the first ring 2. The markings 4 and the indicating element 5 may also have other configurations. For example, but without limitation, the marking are arranged on the circumferential lateral surface of one of the rings 2, 3, while the indicating element 5 is arranged on the second one of the rings 2, 3 of the indicator 1 for management of the filter cartridge 10 and constitutes a square, rectangular or triangular protrusion, which partially overlaps the first ring 2, 3 or a marker printed, painted, glued or otherwise applied on the second ring 2, 3 of the indicator 1 for management of the filter cartridge 10, for example, in a form of an arrow, star, triangle etc.

In a preferred embodiment of the indicator 1 for management of the filter cartridge 10, the first and the second rings 2, 3 are coupled together to functionally form one element, whereby it is still possible to rotate the rings 2, 3 relative to each other, as described above. In a preferred embodiment of the indicator 1, the first and the second rings 2, 3 are connected by means of a protrusion extending at the lower edge of the second ring and arranged in a corresponding notch on the lower side of the first ring 2 of the indicator 1, as shown on the cross-sections in FIG. 4. In one of the preferred embodiments, the protrusion extends around substantially the entire circumferential edge of the second ring 3 of the indicator 1. According to another preferred embodiment, the protrusion extends along a portion of the circumferential edge of the second ring 3 of the indicator. In yet another embodiment, the protrusion is divided into at least two sections arranged in intervals around the circumferential edge of the second ring 3 of the indicator 1. Based on the above method of coupling of the rings 2, 3 of the indicator 1, it will be known to a person skilled in the art, that coupling of the rings 2,3 can also be performed in a reverse configuration. That is, the protrusion/protrusions are arranged on the first ring 2, as described above, whereas the protrusion cooperating with it/them are similarly arranged on the second ring 3. Based on the above description of coupling of the rings 2, 3, a person skilled in the art will be aware which alternative components to apply to arrive at a rotatable coupling of the first and the second rings 2, 3 of the indicator 1 for management of the filter cartridge 10.

At least one of the rings 2, 3 of the indicator 1 comprises means for improving gripping 6 in order to facilitate the gripping of one of the rings 2, 3 by the user and to rotate it relative to the other ring. In a preferred embodiment of the indicator 1 for filter cartridge 10 management of the filter cartridge 10, the means for improving gripping 6 is at least one group of notches on the surface of the second ring 3. Preferably, the means for improving gripping comprises four groups of notches, wherein the groups are arranged substantially symmetrically on the outer circumference of the second ring 3, as shown in FIGS. 1 to 4. Alternatively, or additionally, the means for improving gripping is a notch arranged on the circumference of one of the rings 2, 3, in which the user places their finger in order to rotate one of the rings 2, 3 relative to the other one.

In one of the preferred embodiments, one of the rings 2, 3 comprises mounting means for mounting the indicator 1 for management of the filter cartridge 10 the filtering bottle 7. In a preferred embodiment, the second ring comprises mounting means for mounting the indicator 1 for management of the filter cartridge 10 on the neck 9 of the container 8 of the filtering bottle 7. In another embodiment, the mounting means are arranged on the first ring 2 and are used to mount the indicator 1 for management of the filter cartridge 10 on the container 8 and/or the neck 9 of the filtering bottle 7. In one of the preferred embodiments, the first ring 2 of the indicator 1 comprises at least one notch 17 arranged on the first ring 2 for mounting the indicator 1 on the filtering bottle 7. In a preferred embodiment, the at least in said one notch a latch element 15 is arranged, wherein the latch element 15 is embedded in the said notch on the inner side of the ring 2, i.e., on the main (rotating) axis side of the ring 2. In a preferred embodiment, the first ring 2 of the indicator 1 comprises two notches 17 with latch elements 15 arranged on the opposite sides of the ring 2, as shown in FIGS. 1, 2 and 3. Based on the above disclosure, a person skilled in the art will be aware that at least one notch are arranged on the other ring 3 for coupling the indicator 1 with the filtering bottle 7. Furthermore, based on the above description of the mounting means a person skilled in the art will be aware which alternative components to apply in order to arrive at mounting means for mounting the indicator 1 for management of the filter cartridge 10 to the filtering bottle 7. In yet another embodiment, the indicator 1 for management of the filter cartridge 10 does not comprise any mounting means. In such a case, the indicator 1 for filter cartridge management is loosely placed on the neck 9 of the container 8 or press-fitted thereon.

Figure 7:
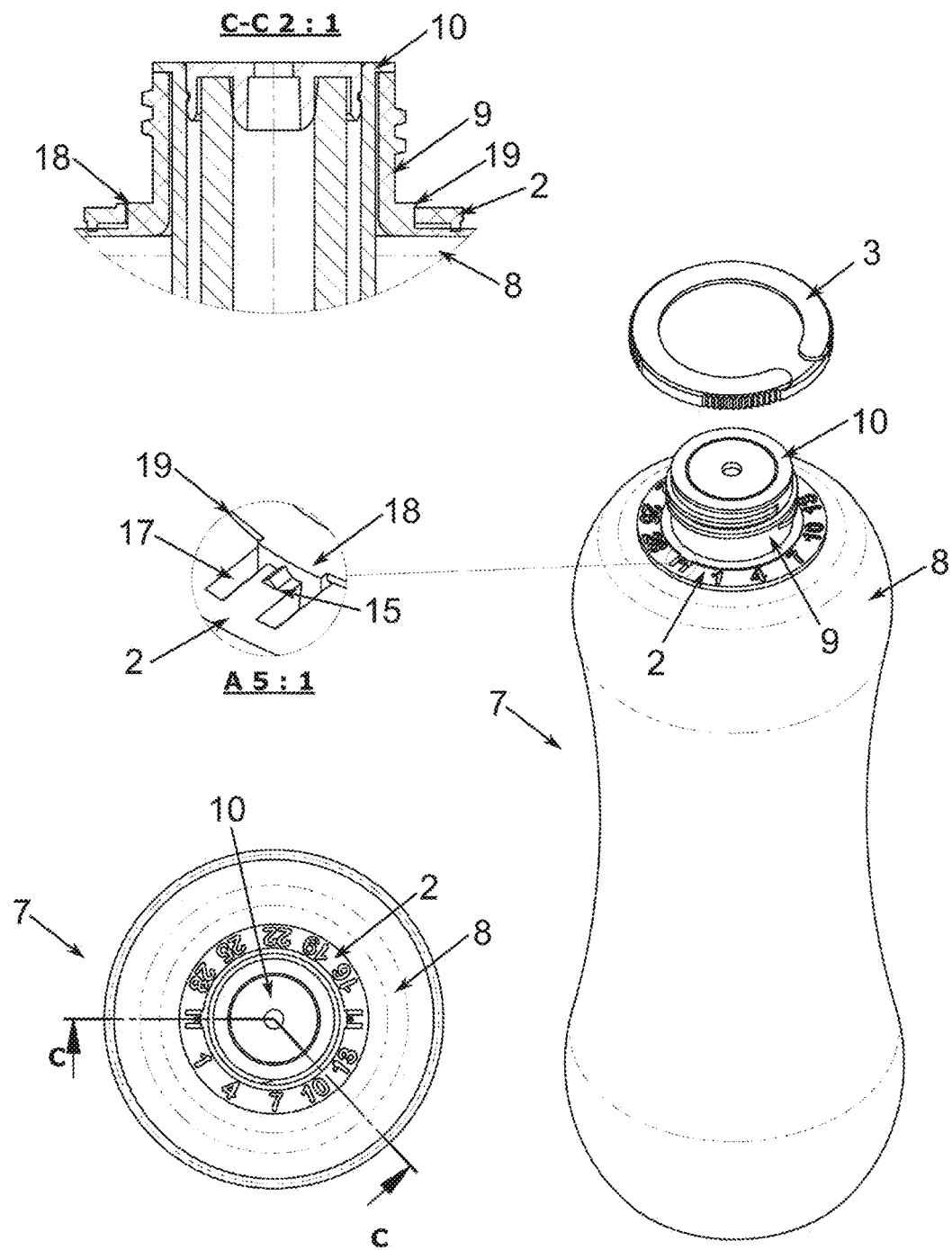
FIG. 7 shows yet another perspective top exploded view of a filtering bottle with an indicator for filter cartridge management according to the embodiment of the invention of FIG. 5, and a top view of the filtering bottle, a close-up view of the detail A and a cross-section along the line C-C, respectively.
Figure 8:
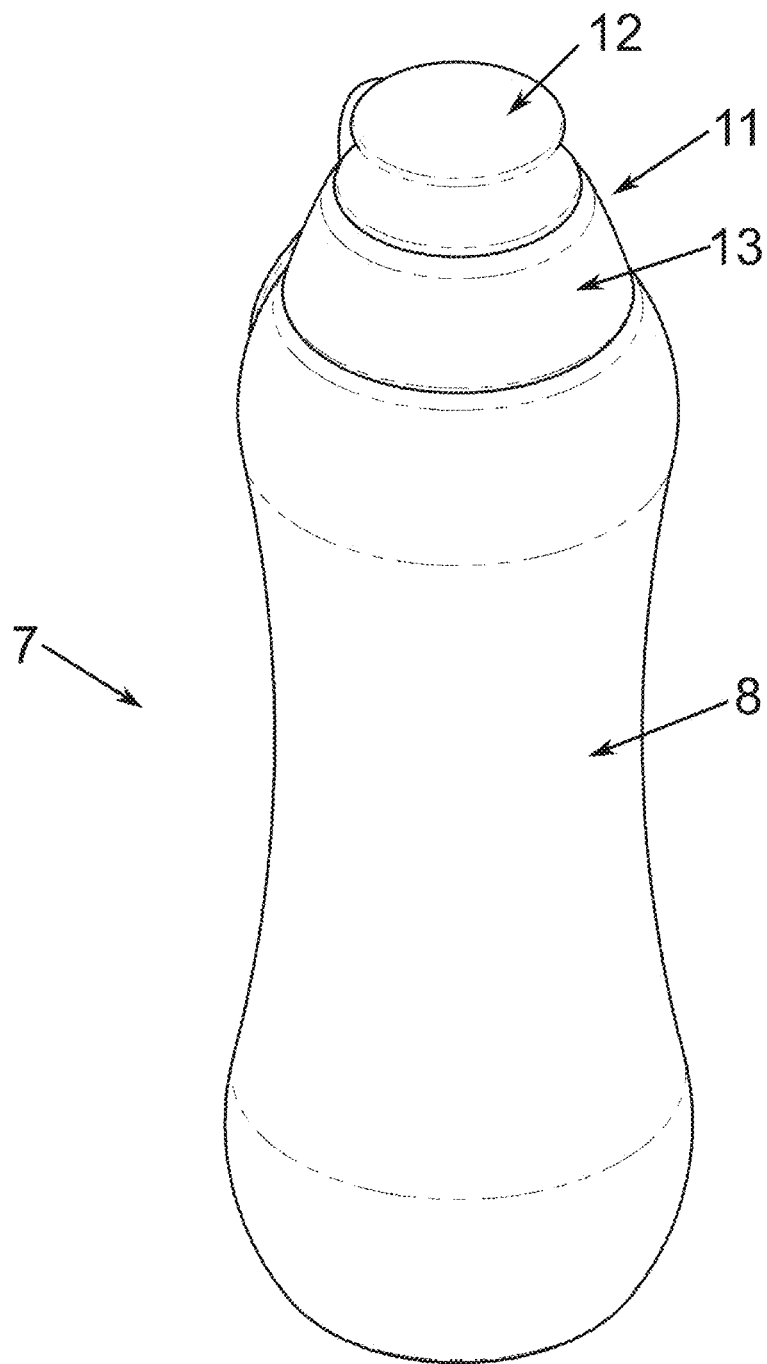
FIG. 8 shows a perspective exploded view of an assembled filtering bottle with an indicator for filter cartridge management according to the embodiment of the invention of FIG. 4.
Figure 9:
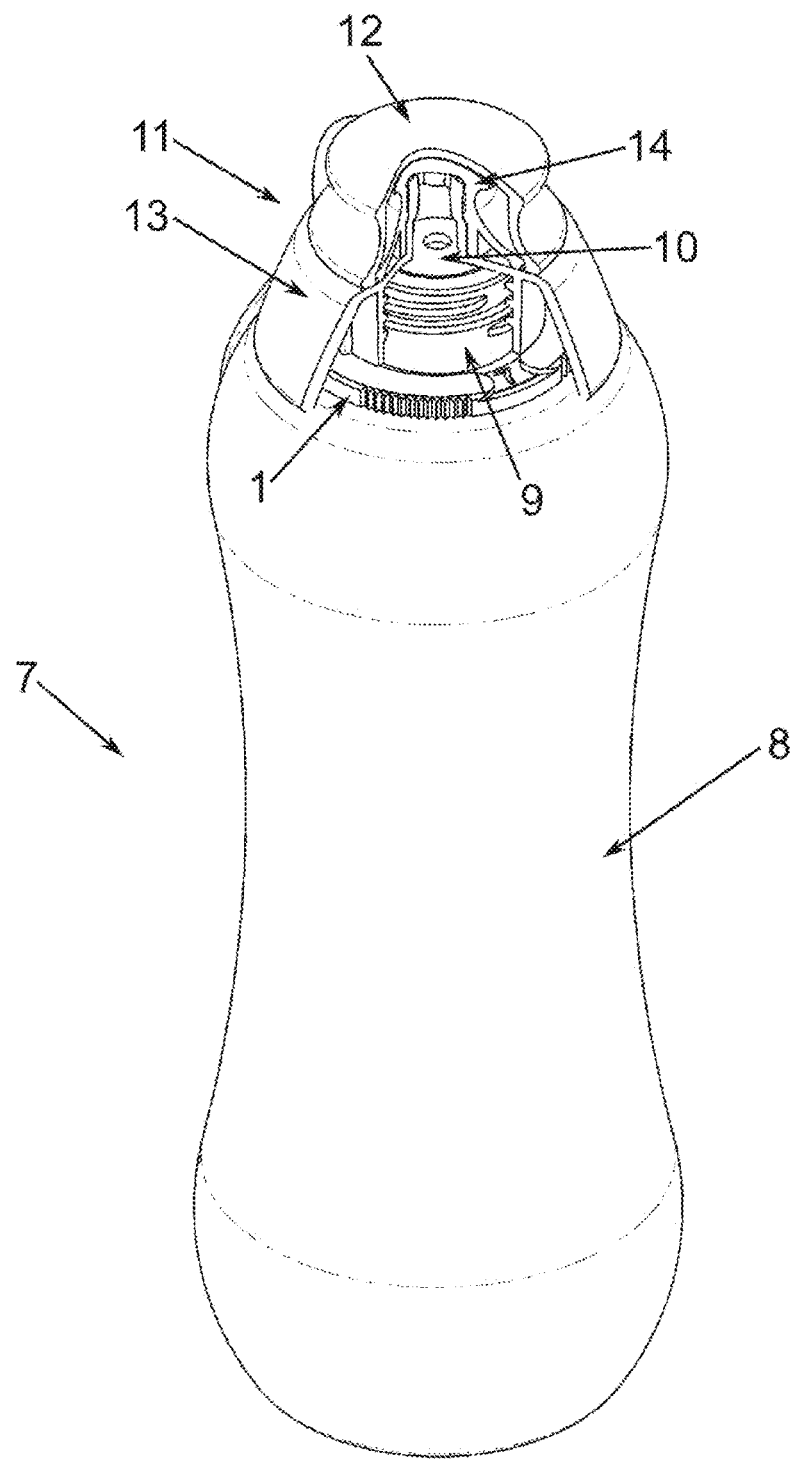
FIG. 9 shows a filtering bottle with an indicator for filter cartridge management according to the embodiment of the invention of FIG. 6, showing a cross-section through a cap.

The indicator 1 for management of the filter cartridge 10, as described above, is used with the filtering bottle 7. As shown in FIGS. 5 to 9, the filtering bottle 7 comprises a container 8. The container 8 is substantially elongated, bottle-shaped. In a preferred embodiment, the container 8 of the filtering bottle 7 is shaped such that the container 8 can be conveniently held in hand. The container 8 comprises a neck 9 with an external thread, in which the filter cartridge 10 is placed. The filter cartridge 10 is a finger filter, which, following installation, rests on the neck 9 of the container 8 and extends into its interior. The filter cartridge 10 is held in place by means of a cap screwed onto the neck 9 of the container 8 by means of a thread on the cap cooperating with the thread on the neck, as shown in FIG. 9. The cap 11 comprises a coat 13, which extends around the cap and rests on the surface of the container 8 of the filtering bottle 7, as shown in FIG. 8. The cap 11 comprises a hood 12 flexibly connected with the cap 11, which allows to cover and uncover a mouthpiece 14, arranged at the top of the cap 11, as shown in FIG. 9. The mouthpiece 14 enables the user to drink water from the filtering bottle 7. Moreover, the mouthpiece 14 closes the flow of water from the filtering bottle 7 when the user is not drinking from the bottle. The cap 11 with the hood and the mouthpiece 14 is known as such and will not be described herein in more detail.

The indicator 1 for management of the filter cartridge 10 according to the invention is installed in the filtering bottle 7 such that the neck 9 of the container 8 runs through the central opening of the first and second rings 2, 3. Consequently, the indicator 1 for management of the filter cartridge 10 embraces the neck 9 of the container 8 of the filtering bottle 7. The first ring 2 of the indicator 1 rests, but not necessarily, on the container 8 around the neck 9. In one of the embodiments, the indicator for filter cartridge management is mounted loosely around the neck 9 of the container 8 of the filtering bottle 7. In another embodiment, the indicator 1 for management of the filter cartridge 10 is press-fitted around the neck 9 of the container 8. In yet another embodiment, the indicator 1 for management of the filter cartridge 10 is mounted in the filtering bottle 7 round the neck 9 of the container 8 by means of mounting means, if present, as described above.

The indicator 1 for management of the filter cartridge 10 is mounted fixedly or removably. When the filter cartridge 10 management indicator 1 is mounted removably, it can be replaced when needed, for example, when the indicator 1 for filter cartridge management is damaged. Mounting of the indicator 1 for management of the filter cartridge 10 to the container 8 of the filtering bottle 7, as described above, may also be performed by means of adhesive binders, glues and similar techniques. A person skilled in the art will be aware which means and techniques to apply to removably install the indicator 1 for management of the filter cartridge 10 and, therefore, they will not be described in detail herein. In a preferred embodiment of the filtering bottle 7 with the indicator 1 for management if the filter cartridge 10, the indicator 1 is additionally kept in place by a portion of the cap 11, wherein said portion is screwed onto the neck 9 of the container 8 of the filtering bottle. In an assembled condition of the filtering bottle 7 with the indicator 1 for management if the filter cartridge 10, said indicator 1 is arranged under the coat 13, as shown in FIG. 9. If the cap 11 with the coat 13 is made of a non-transparent material, the indicator 1 for management of the filter cartridge 10 is not visible during normal use, as shown in FIG. 8. If the cap 11 with the coat 13 is made of a transparent material, the indicator 1 for management of the filter cartridge 10 is visible during normal use, allowing the user to check the indication 4 set on the indicator 1 for management of the filter cartridge 10 of the bottle 7. In one preferred embodiment of the filtering bottle 7, around the neck there is at least one protrusion 18, which, following installation of the indicator 1 for management of the filter cartridge 10, is arranged in the at least one corresponding notch 17 on the first or second rings 2, 3 of the indicator 1, as shown in FIG. 7. In another preferred embodiment of the filtering bottle 7, around the neck 9 of the filtering bottle 7, there is provided the same number of protrusion 18 as notches 17 on the first and the second ring 2, 3, such that each protrusion 18 is coupled with a corresponding notch on said first or second rings 2, 3. The protrusion 18 is provided in order to ensure stability of the indicator 1 during setting the desired marking 4. That is, during setting the marking 4 on the indicator 1 for management of the filter cartridge 10, it is possible to rotate one of the rings 2, 3 relative to the other to arrive at the desired setting relative the neck 9 of the container 8 of the filtering bottle 7. In a preferred embodiment, as shown in FIG. 7, the first ring 3 of the indicator 1 is fixed relative to the container by means of two notches 17 and the corresponding two protrusions 18, as described above, while the second ring 3 is rotatably movable relative to the first ring 2 of the indicator 1 and the container 8 of the filtering bottle 7 and allows to indicate the selected marking 4 on the first ring. As already mentioned above, based on the above method of coupling of the ring 2 of the indicator 1, a person skilled in the art will be aware, that the coupling of the rings 2, 3 may be performed in a reverse configuration. This means that the notches 17 are arranged on the second ring 3, as described above for the first ring 2. In such a case, the second ring 3 is fixed relative to the container by means of the said notches 17 and the corresponding two protrusions 18 on the container 8, as described above, while the first ring 2 is rotatably movable relative to the second ring 3 of the indicator 1 and the container 8 of the filtering bottle 7 and allows to indicate the selected marking 4 on the first ring 1. Alternatively, or additionally, around the neck 9 of the container 9 of the filtering bottle a rim 19 is arranged for protecting the indicator 1 for management of the filter cartridge 10 against unintended slipping off the neck 9 of the container 8. The rim 19 snaps onto one of the rings 2, 3 of the indicator 1, holding the said indicator 1 in place around the neck 9 of the container 8. In a preferred embodiment, as shown in FIG. 4, the rim 19 is snapped onto the first ring 2 of the indicator 1 for management of the filter cartridge 10. A person skilled in the art will also be aware that based on the above description of the method of installing the indicator 1 on the container 8 of the filtering bottle 7 which alternative components to apply to arrive at the desired mounting of the indicator 1.

To install or replace a worn filter cartridge 10, the cap 11 is unscrewed, provided that said cap 11 is mounted on the container 8 of the filtering bottle 7, and the filter cartridge 10 is slid out of the neck 9 of the container 8 of the filtering bottle 7. Then, a new filter cartridge 10 or a previously reconditioned filter cartridge 10 is slid into its place. Alternatively, a removed filter cartridge 10 is reconditioned immediately after removal and, following reconditioning, it is inserted back into the neck 9 of the container 8 of the filtering bottle 7. During installation or replacement of the filter cartridge 10, the user has access to the indicator 1 for management of the filter cartridge 10. On the indicator 1 for management of the filter cartridge 10 the user sets the time of installation or replacement of the filter cartridge 10 by rotating one of the ring 2,3 of the indicator 1 relative to the other ring 2, 3, setting appropriately the indicating element 5 relative to the marking 4 such that the visible or indicated marking reflects the moment of installation or replacement of the filter cartridge 10, for example, the weekday, week or month of installation or replacement of the filter cartridge 10. This way, the indicator 1 for management of the filter cartridge 10 makes it easier for the user of the filtering bottle 7 to determine the time when the filter cartridge 10 should be replaced. Alternatively, the method described above is used to set a time unit, for example, the number of days, a weekday, the number of months, a month following which or during which the filter cartridge 10 should be replaced or reconditioned. Hence, the indicator 1 for management of the filter cartridge 10 in the filtering bottle 7 helps the user even more to indicate the moment when the filter cartridge 10 should be changed or reconditioned. In the most preferred embodiment of the filtering bottle 7 with the indicator 1 for management of the filter cartridge 10, a number is set on the indicator to indicate the month in which the filter cartridge 10 should be changed or reconditioned. Following filling the container 10 with water to be treated, installing a new filter cartridge 10 or a reconditioned filter cartridge 10, setting the indicator 1 for management of the filter cartridge 10, as described above, the cap 10 is screwed back onto the neck 9 of the container 8 and the bottle is ready to be used by the user. Importantly, each time the filtering bottle 7 is filled with water, the user must remove the cap 11 and so gains access to the indicator 1 for management of the filter cartridge 10 and is able to determine or conclude that the filter cartridge 10 needs or will soon need changing or reconditioning.

The indicator 1 for management of the filter cartridge 10 according to the invention may be provided to the user separately as a consumable for dedicated filtering bottles. The indicator 1 for management of the filter cartridge 10 according to the invention may also be provided to the user as an extension element for the already available filtering bottles 7. The indicator 1 for management of the filter cartridge 10 according to the invention may also be provided to the user in a set of consumables for the filtering bottle 7 together with the filter cartridge 10 for self-replacement, if necessary. The indicator 1 for management of the filter cartridge 10 according to the invention may be provided as being mounted on an assembled filtering bottle 7, practically ready for use by the user. The indicator 1 for management of the filter cartridge 10 may also be provided to the user in the form of an indicator set and all components in a single set, where the user assembles the filtering bottle 7 on their own together with the indicator for management of the filter cartridge 10 according to the present invention.

Although the indicator 1 for management of the filter cartridge 10 is described above as mounted and used on the filtering bottle 7, the indicator 1 for management of the filter cartridge 10 may be used out of the filtering bottle 7. That is, the indicator 1 for management of the filter cartridge 10 is not mounted on the container 8 of the filtering bottle 7. In such a case, when installing the filter cartridge 10 in the filtering bottle or removing it therefrom, the indicator 1 is set, as described above, and placed in its storage location, for example, on a kitchen shelf. The user periodically checks if the filter cartridge 10 is due to be replaced as recommended.

The invention is presented in preferred embodiments described herein by way of the example only. The invention is not limited to the embodiments described above. Changes, variants to and equivalents of the present invention are possible without departing from the spirit of the present invention, defined by the following patent claims.

LIST OF REFERENCE NUMBERS 1 an indicator for management of a filter cartridge of a filtering bottle
2 a first ring of the indicator 1
3 a second ring of the indicator 1
4 a time unit markings on the first ring 2 of the indicator 1
5 an indicating element for indicating the marking 4 on the second ring 3 of the indicator 1
6 means for improving gripping
7 a filtering bottle
8 a container of the filtering bottle 7
9 a neck of the container 8 of the filtering bottle 7
10 a filter cartridge for the filtering bottle 7
11 a cap of the filtering bottle container
12 a hood of the cap 11 of the filtering bottle 7
13 a coat of the cap 11
14 a mouthpiece 7 of the cap 11 of the filtering bottle 7
15 a latch element on the first ring 2 of the indicator 1
16 cavities on the second ring 3 of the indicator 1
17 notches on the first ring 2 of the indicator 1
18 a protrusion on the ring around the neck 9 of the container 8 of the filtering bottle 7
19 a rim around the neck 9 the container 8 of the filtering bottle

The invention claimed is:
1. A filtering bottle with an indicator for management of the filter cartridge, the bottle comprising:
a container comprising a neck,
a filter cartridge located in the neck and extending into the container of the filtering bottle,
a cap comprising a coat, arranged on the neck of the container of the filtering bottle and holding the filter cartridge in the neck of the container, and
an indicator for management of the filter cartridge,
wherein the indicator for management of the filter cartridge comprises
a first ring,
a second ring,
wherein the second ring is arranged coaxially on the first ring along a main axis extending through central openings of the first and second rings,
wherein the first and the second rings are rotatable relative to each other around the main axis,
wherein one of the rings comprises markings related to the filter cartridge arranged around said ring and defining a time unit,
wherein the other of the rings comprises an indicating element for indicating the marking selected related to the filter cartridge by rotating one of the rings relative to the other ring,
wherein the indicator for management of the filter cartridge is arranged around the neck of the container of the filtering bottle under the coat of the cap, and wherein the central openings of the first and second rings are sized so as to receive the neck of the container such that the neck of the container of the filtering bottle extends through the central openings of the first and the second rings of the indicator and the indicator is arranged in a proximity of the container of the filtering bottle.

2. The bottle according to claim 1, wherein the markings relating to the filter cartridge of the indicator for management of the filter cartridge are markings defining at least one of the weekdays, weeks, months.

3. The bottle according to claim 1, wherein the markings relating to the filter cartridge of the indicator for management of the filter cartridge are selected from among the time unit indicating the time of installation of the filter cartridge and the time unit indicating the recommended time of replacement of the filter cartridge.

4. The bottle according to claim 1, wherein the indicating element of the indicator for management of the filter cartridge is a window for displaying the marking.

5. The bottle according to claim 1, wherein the indicating element of the indicator for management of the filter cartridge is a protrusion for indicating the marking.

6. The bottle according to claim 1, wherein the indicating element of the indicator for management of the filter cartridge is a symbol for indicating the marking.

7. The bottle according to claim 1, wherein the indicator for management of the filter cartridge is attached to the filtering bottle by means of mounting means comprised by at least one of the rings.

8. The bottle according to claim 1, wherein at least one of the rings of the indicator for management of the filter cartridge comprises means for improving gripping.

9. The bottle according to claim 8, wherein the means for improving gripping is a cavity on the circumference of one of the rings.

10. The bottle according to claim 8, wherein the means for improving gripping is a series of notches on the circumference of one of the rings.

11. The bottle according to claim 8, wherein the means for improving gripping is a protrusion on the circumference of one of the rings.

12. A set of a filtering bottle and an indicator for management of a filter cartridge, the set comprising
a filtering bottle comprising (i) a container comprising a neck, (ii) a filter cartridge for placing in the neck of the container of the filtering bottle and (iii) a cap with a coat for placing on the neck of the container of the filtering bottle, and
an indicator for management of the filter cartridge,
wherein the indicator for management of the filter cartridge comprises:
a first ring,
a second ring,
wherein the second ring is arranged coaxially on the first ring along a main axis extending through central openings of the first and second rings,
wherein the first and the second rings are rotatable relative to each other around the main axis,
wherein one of the rings comprises markings relating to the filter cartridge arranged around said ring and defining a time unit, and
wherein the other of the rings comprises an indicating element for indicating the marking selected related to the filter cartridge by rotating one of the rings relative to the other ring,
wherein the indicator for management of the filter cartridge is adapted for mounting around the neck of the container of the filtering bottle under the coat of the cap, and
wherein the central openings of the first and second rings are sized so as to receive the neck of the container such that, when the indicator is mounted, the neck of the container of the filtering bottle extends through the central openings of the first and the second rings of the indicator and the indicator is arranged in a proximity of the container of the filtering bottle.

13. The set according to claim 12, wherein the markings of the indicator for management of the filter cartridge are markings defining at least one of the days of the week, weeks, months.

14. The set according to claim 12, wherein the markings relating to the filter cartridge of the indicator for management of the filter cartridge are selected from among the time unit indicating the time of installation of the filter cartridge and the time unit indicating the recommended time of replacement of the filter cartridge.

15. The set according to claim 12, wherein the indicating element of the indicator for management of the filter cartridge is a window for displaying the marking.

16. The set according to claim 12, wherein the indicating element of the indicator for management of the filter cartridge is a protrusion for indicating the marking.

17. The set according to claim 12, wherein the indicating element of the indicator for management of the filter cartridge is a symbol for indicating the marking.

18. The set according to claim 12, wherein at least one of the rings of the filter cartridge management indicator comprises mounting means for mounting the indicator to the bottle.

19. The set according to claim 12, wherein at least one of the rings of the indicator for management of the filter cartridge comprises means for improving gripping.

20. The set according to claim 19, wherein the means for improving gripping is a cavity on the circumference of one of the rings.

21. The set according to claim 19, characterized in that the means for improving gripping is a series of notches on the circumference of one of the rings.

22. The set according to claim 19, wherein the means for improving gripping is a protrusion on the circumference of one of the rings.

* * * * *